United States Patent [19]
Yamada

[11] Patent Number: 5,999,120
[45] Date of Patent: Dec. 7, 1999

[54] METHOD FOR DETERMINING PHASE CORRECTION VALUES IN RADAR APPARATUS

[75] Inventor: Yukinori Yamada, Susono, Japan

[73] Assignee: Toyota Jidosha Kabushiki Kaisha, Japan

[21] Appl. No.: 09/288,664

[22] Filed: Apr. 9, 1999

[30] Foreign Application Priority Data

May 19, 1998 [JP] Japan ................................. 10-136825

[51] Int. Cl.$^6$ ...................................................... G01S 7/40
[52] U.S. Cl. .......................... 342/174; 342/165; 342/368
[58] Field of Search .................................. 342/154, 157, 342/165, 174, 368, 372

[56] References Cited

U.S. PATENT DOCUMENTS 5,063,529  11/1991  Chapoton ........................... 364/571.02
5,111,208   5/1992  Lopez ....................................... 342/174
5,592,179   1/1997  Windyka ................................. 342/372

FOREIGN PATENT DOCUMENTS 6-88869   3/1994   Japan .

OTHER PUBLICATIONS

"Method for Detecting Errors of DBF Radar", Toyota Technical Reports, pp. 349–351 (Toyota Gijutsu Kokaishu Issue No. 7294, issued Dec. 25, 1997).

*Primary Examiner*—Thomas H. Tarcza
*Assistant Examiner*—Dao L. Phan
*Attorney, Agent, or Firm*—Finnegan, Henderson, Farabow, Garrett & Dunner, L.L.P.

[57] ABSTRACT

The present invention relates to a method for determining a phase correction value in a radar apparatus provided with an array antenna comprised of a plurality of antenna elements as a receiving antenna. The method for determining the phase correction value according to the present invention has a first step of obtaining a first correction value for each channel for correcting a phase shift between channels of the plural antenna elements, a second step of obtaining a second correction value for each channel for correcting a deviation between an electrical center direction and a front direction obtained with phase correction using the first correction values, and a third step of obtaining a final correction value for each channel from the first correction value and the second correction value, and the method determines such a phase correction value as to match the direction of 0° with the electrical center direction for each channel.

3 Claims, 5 Drawing Sheets

METHOD FOR DETERMINING PHASE CORRECTION VALUES IN RADAR APPARATUS

BACKGROUND OF THE INVENTION

1. Field of the Invention

The present invention relates to a radar apparatus equipped with an array antenna comprised of a plurality of antenna elements as a receiving antenna and arranged to detect a target bearing from phase differences between signals received by the respective antenna elements and, more particularly, to a method for determining phase correction values therein.

2. Related Background Art

A digital beam forming (DBF) radar apparatus is an example of the radar apparatus of this type. Since the DBF radar apparatus employs a method for electronically scanning a desired range, it needs no scanning mechanical portion and has characteristics of being compact, lightweight, and strong against vibration and the like. Because of these features, it is expected to be used as a radar apparatus for vehicle.

In the radar apparatus of this type, phases of waves reflected by a target positioned at the front or in the direction of 0° must be theoretically equal among the antenna elements. Disagreement is, however, encountered between the phases because of manufacturing variations in practice. It is thus common practice to cancel out the disagreement between the phases due to the manufacturing variations by giving phase correction values to the respective antenna element channels at the stage of signal processing.

Since the phase correction values of the respective channels are specific to each radar apparatus produced, they are determined by measurement for each apparatus. As a method for determining the phase correction values there is, for example, the "Method for detecting errors of DBF radar" disclosed in Toyota Technical Reports (Toyota Gijutsu Kokaishu issue No. 7294 issued Dec. 25, 1997). According to this technique, a target is placed at a position assumed to be the front (the direction of 0°) of the radar apparatus, the radar apparatus is actuated channel by channel for every antenna element, and phase correction values are determined for the respective channels so as to match the phases of receive signals at the respective channels with each other.

The phase correction values of the respective channels are stored in a memory section of the radar apparatus and correction is carried out with these phase correction values on the occasion of the DBF signal processing, thereby canceling out the phase shifts between the channels due to the manufacturing variations.

By this conventional method for determining the phase correction values, the 0° directions of the respective antenna elements agree with each other to become the direction of 0° in terms of the structure of the radar apparatus. There was, however, a problem that the 0° direction was not always coincident with an electrical center of the radar apparatus. This is caused by assembling errors etc. between the housing of the radar apparatus and the antenna.

It raised the possibility of detection error; for example, in cases where the radar apparatus was mounted on a vehicle for the purpose of front detection, when the apparatus was mounted so as to match the 0° direction of the radar apparatus with the front of the vehicle, the detection area of the radar apparatus deviated from the front of the vehicle.

SUMMARY OF THE INVENTION

The method for determining the phase correction values of the radar apparatus according to the present invention was elaborated in order to solve this problem and comprises a first step of obtaining a first correction value for each channel for correcting a phase shift between channels of plural antenna elements, a second step of obtaining a second correction value for each channel for correcting a deviation between an electrical center direction and a front direction (0° direction) obtained with phase correction using the first correction values, and a third step of obtaining a final correction value for each channel from the first correction value and the second correction value.

The final correction values obtained by this method for determining the phase correction values of the radar apparatus are stored in a memory section of the radar apparatus and the phase of each channel is corrected with this final correction value in a signal processing section, whereby the phase shifts are canceled between the channels and the 0° direction agrees with the electrical center direction.

In the first step, a first target is placed at the structural front of the radar apparatus and the radar apparatus is actuated channel by channel for every antenna element. It is desirable then to obtain a phase correction value for each channel so as to match the phases of signals reflected by the first target and reaching the respective antenna elements with each other and to employ this phase correction value as the first correction value.

In the second step, desirably, second and third targets having an equal cross section of reflection to that of the first target are placed at uniform distance from the radar apparatus and at uniform spacing to the first target, the radar apparatus is actuated to detect the first to third targets with effecting the phase correction with the first correction values, and the second correction values are obtained based on detection levels of the respective targets.

If the 0° direction agrees with the electrical center direction the detection levels of the second and third targets with respect to the first target will become equal to each other. Conversely, if the two directions disagree a difference will appear between the detection levels of the second and third targets. Therefore, an angular difference can be detected between the 0° direction and the electrical center direction from the level difference and phase correction values determined according to the angular difference can be used as the second correction values.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
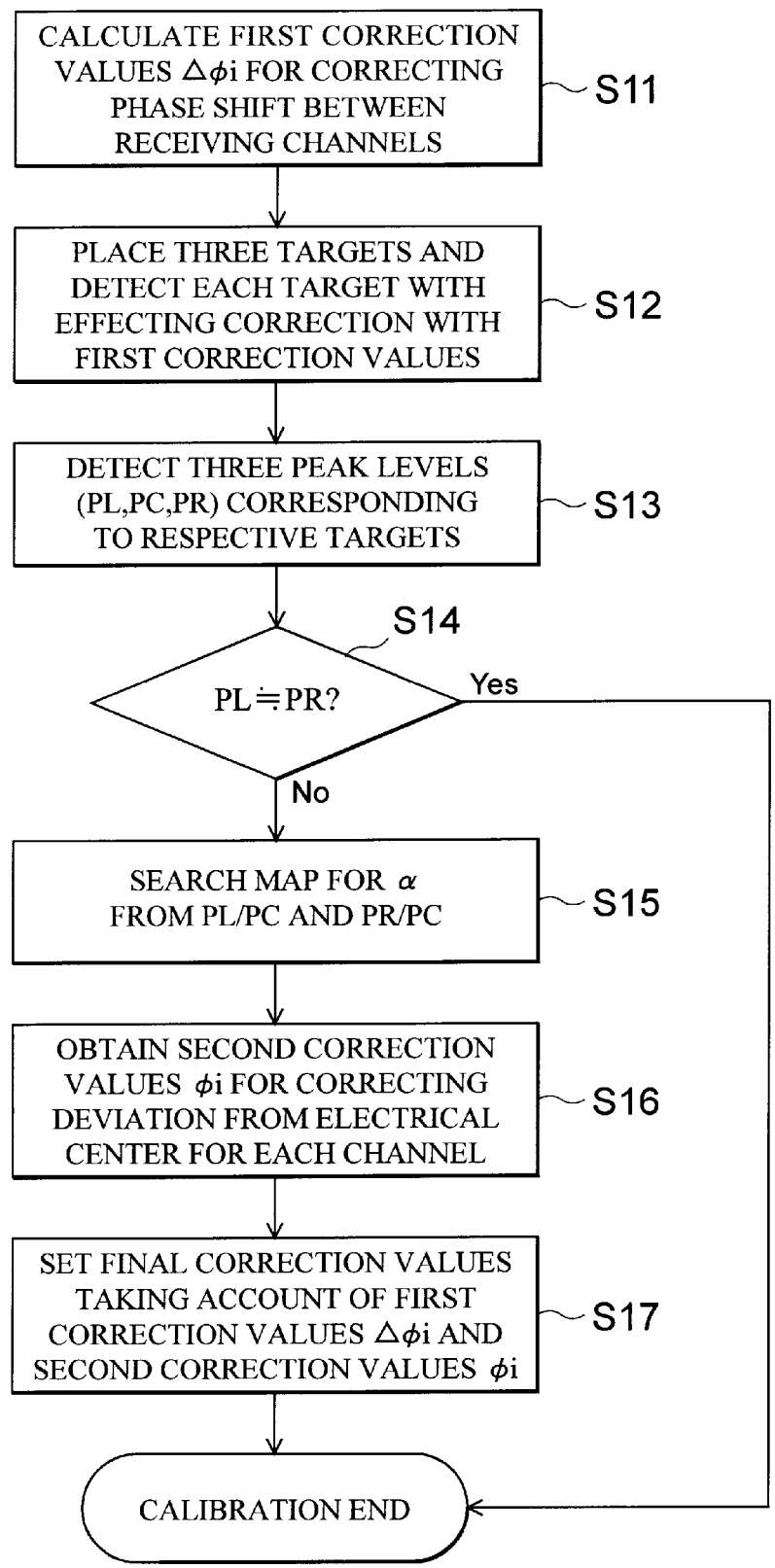
FIG. 1 is a flowchart to show an embodiment of the present invention.
Figure 2:
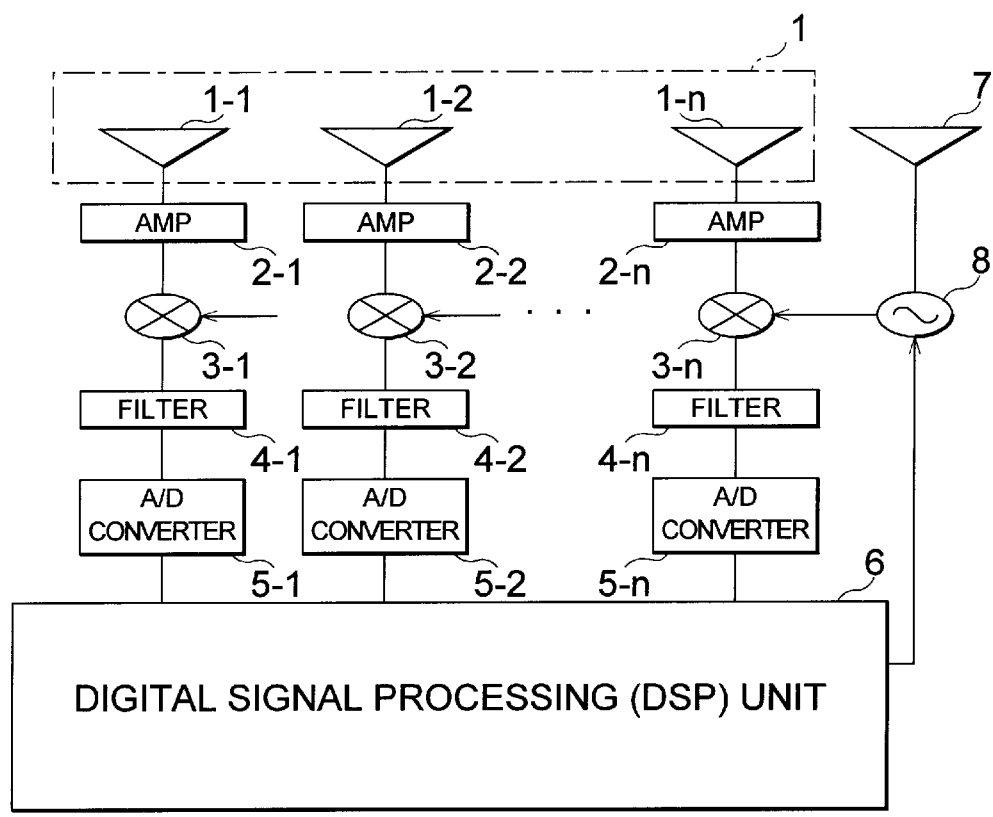
FIG. 2 is a block diagram to show an example of the radar apparatus used in this embodiment.

FIG. 1 is a flowchart to show procedures in the method for determining the phase correction values in the radar apparatus as an embodiment of the present invention and FIG. 2 is a diagram to show an example of the radar apparatus to which the method for determining the phase correction values is applied.

The radar apparatus illustrated in FIG. 2 is an ordinary DBF radar apparatus which has a transmitting antenna 7 and a receiving antenna 1. The receiving antenna 1 is an array antenna comprised of n antenna elements 1-1 to 1-n. For each channel of antenna element there are a low-noise amplifier 2-1 to 2-n and a mixer 3-1 to 3-n provided, and in each mixer a received signal is mixed with a transmitted signal from an oscillator 8, whereupon the received signal is downconverted to a base-band signal. Each base-band signal in a corresponding channel is supplied via a filter 4-1 to 4-n to an A/D converter 5-1 to 5-n to be converted into a digital signal and the digital signal is supplied to a digital signal processing circuit (DSP circuit) 6.

The DSP circuit 6 can freely change the phase and amplitude by digital processing. A directional pattern of the antenna can be formed in an arbitrary direction and in an arbitrary shape by correcting the phase and amplitude of the digital received signal of each channel according to a certain rule by use of the function of the DSP circuit and further synthesizing the signals of all the channels. To form the directional pattern of the antenna by digital signal processing in this way is called digital beam forming (DBF).

During this DBF operation initial phase correction is carried out using the phase correction values determined by the present embodiment. The phase correction values are stored in a memory section in the DSP circuit 6.

The method for determining the phase correction values in the present embodiment will be described according to the flowchart of FIG. 1.

First, step S11 is to calculate the first correction values $\Delta\phi i$ (i=1, 2, . . . , n) for the respective channels for correcting the phase shifts between the receiving antenna channels.

Figure 3:
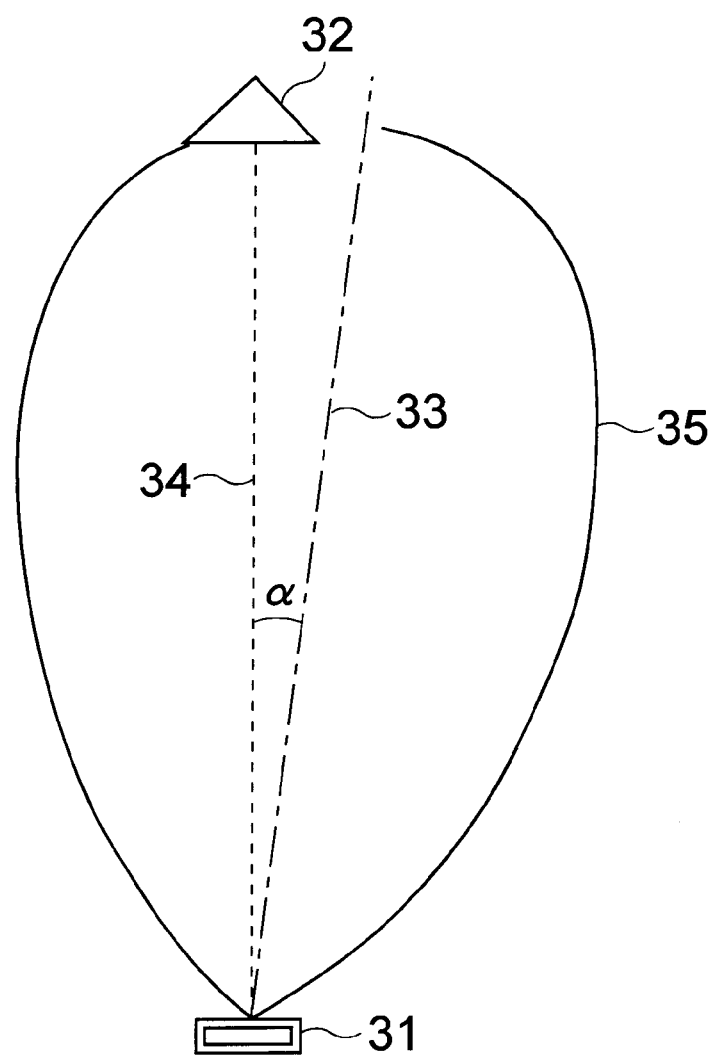
FIG. 3 is a drawing to show the arrangement of the radar apparatus and the first target.

FIG. 3 is a diagram for explaining a method employed in the calculation of the first correction values $\Delta\phi i$. As illustrated in FIG. 3, the first target 32 as a reference target is placed at the structural front (in the 0° direction) of the radar apparatus 31. The target 32 is desirably a point target like a corner reflector. The position of the target 32 can be an approximate front.

In this arrangement the radar apparatus is then actuated channel by channel for every antenna element. Supposing the distance from the radar apparatus 31 to the target 32 is, for example, approximately 10 m, waves radiated from the transmitting antenna, re-radiated from the target 32, and entering the respective antenna elements can be assumed to be parallel waves, and in this state the received signal of each channel is detected to obtain the phase and amplitude thereof.

After that, with respect to the reference at the phase and amplitude of a channel selected at random, for example, the channel of the antenna element located at the center of the receiving antenna, a correction value of each channel is determined so as to make the phase and amplitude of the other channels equal to those of the center channel. The phase correction values obtained at this time are the first correction values $\Delta\phi i$ (i=1, 2, . . . , n). In other words, such a phase correction value as to match the direction 34 to the first target 32 with the 0° direction is obtained for each channel and this phase correction value is used as the first correction value $\Delta\phi i$.

In FIG. 3, the direction indicated by numeral 33 represents the electrical center direction of the radar apparatus 31, which has a deviation of an angle $\alpha$ from the structural center direction 34 to the right. In the step of securing the antenna to the housing of the radar apparatus, it is desirable to match the electrical center direction 33 with the structural center direction 34. It is, however, difficult to substantiate it and, thus, the two directions normally disagree with each other as illustrated in this figure. The region indicated by solid line 35 is an effective beam range of the radar apparatus 31, which indicates the directional pattern of the beam resulting from the antenna pattern. The shape of the beam range is symmetric with respect to the electrical center direction 33.

Figure 4:
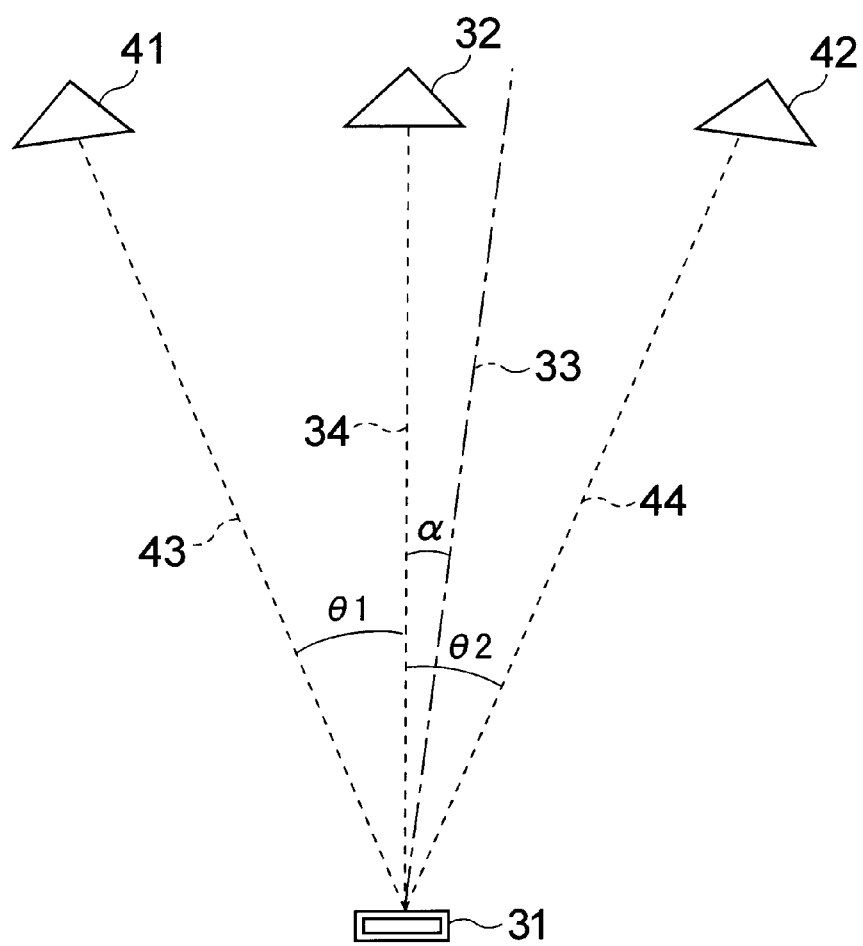
FIG. 4 is a drawing to show the arrangement of the radar apparatus and the first to third targets.

Next, the flow proceeds to step S12. In this step, as illustrated in FIG. 4, the second target 41 and the third target 42 having the same cross section of reflection as the first target 32 are placed on either side of the first target 32. The distances between the radar apparatus 31 and the first to third targets 32, 41, 42 are all equal and the spacings between the first target 32 and the second target 41 or the third target 42 are also equal. This means that the first to third targets 32, 41, 42 are located on a circular arc with the center at the radar apparatus 31 and an angle $\theta 1$ made by the direction 43 directed from the radar apparatus 31 to the second target 41 and the direction 34 to the first target 32 is equal to an angle $\theta 2$ made by the direction 44 directed from the radar apparatus 31 to the third target 42 and the aforementioned direction 34.

In this state the radar apparatus 31 is actuated to detect the first to third targets 32, 41, 42. At this time, the phase of each channel is subject to initial correction with the first correction values $\Delta\phi i$ obtained in step S11 and thereafter the DBF operation is carried out to detect the targets.

Figure 5:
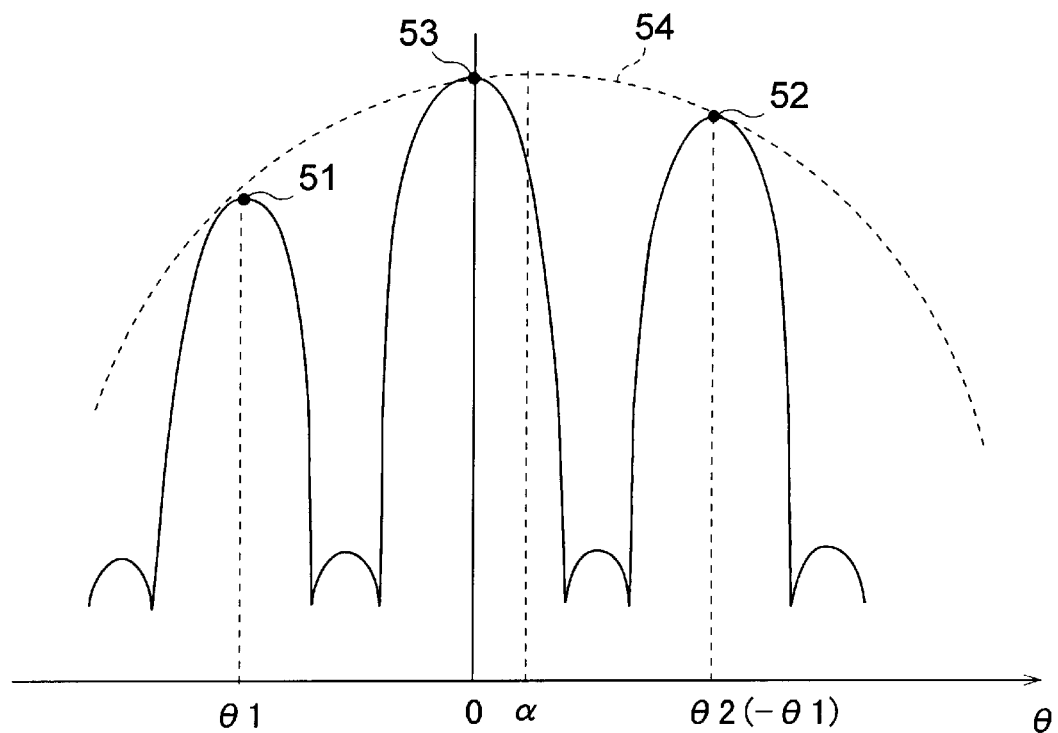
FIG. 5 is a graph to show the detection result of the first to third targets by the radar apparatus.

FIG. 5 is a graph to show the DBF detection result at this time, in which the abscissa indicates the angle $\theta$ and the ordinate the detection level. Since the phase shifts between the channels are corrected with the first correction values $\Delta\phi i$, detection level peaks 51, 52 to indicate the second and third targets 41, 42 appear accurately at respective positions of the angles $\theta 1$ and $\theta 2$ on either side of the first target 34.

Then the flow proceeds to step S13 to detect three detection peak levels PL51, PC53, and PR52 corresponding to the second, first, and third targets.

As indicated by a line denoted by numeral 54 in FIG. 5, the detection level peaks of waves re-radiated from the uniform reflection targets at the uniform distance from the radar apparatus 31 decrease in symmetry with respect to the position of the angle $\alpha$ which is the electrical center direction. Therefore, the detection peak levels PL51, PC53, PR52 of the second, first, and third targets are different as illustrated.

Then the angle $\alpha$ is obtained by making use of the differences between these detection peak levels.

First, step S14 is to compare the detection peak level PL51 with PR52 and determine whether the two levels are equal. If PL51 is equal to PR52 it can be said that the direction 34 of the first target 32 is coincident with the electrical center direction 33, i.e., that the angle $\alpha$ is 0. In this case no more phase correction is necessary and the first correction values Δφi are determined as final correction values and are set in the memory section of the radar apparatus 31, thereby completing the correction operation (calibration).

If in step 14 there is a difference between the detection peak levels PL51 and PR52 it is understood that disagreement occurs between the direction 34 of the first target 32 and the electrical center direction 33. In that case the flow then proceeds to step S15 to calculate ratios of the detection peak levels PL51 and PR52 to the detection peak level PC53, i.e., PL/PC and PR/PC. After that, the angle α is obtained by map searching from the level ratio PL/PC and the level ratio PR/PC.

Since the directional pattern of beam is preliminarily known from the antenna pattern, the relationship of the angle a with the level ratio PL/PC and the level ratio PR/PC is specified uniquely if the arrangement of the three targets 32, 41, 42 is determined with respect to the radar apparatus 31. Therefore, the angle α can be obtained from the level ratio PL/PC and the level ratio PR/PC if the relationship is preliminarily stored in the form of a map table in an ROM.

Step S16 is to calculate the second correction values φi (where i represents channel numbers: i=1, 2, . . . , n) from the obtained angle α according to Eq. (1) below.

$$\phi i = 2\pi(i-1)d\sin \alpha/\lambda \qquad (1)$$

Here, λ is the wavelength of the transmitted signal and d the distance between the antenna elements adjacent to each other.

In the end, step S17 is to calculate the final correction values by subtracting the second correction values φi from the first correction values Δφi. Then the final correction values are stored in the memory section of the radar apparatus 31 and the apparatus is so set as to carry out the initial phase correction using the final correction values on the occasion of the operation of the radar apparatus 31.

The present embodiment is arranged to obtain the angle α by the map searching from the level ratio PL/PC and the level ratio PR/PC in order to raise the accuracy, but it is noted that the angle α can also be specified from only either one of the level ratios.

When the correction values for the initial phase correction are determined using the method for determining the phase correction values of the radar apparatus according to the present invention as described above, the radar apparatus can be obtained under the condition in which the 0° direction always agrees with the electrical center direction. Namely, we can obtain the radar apparatus in which the left and right detection areas are symmetric.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for determining a phase correction value in a radar apparatus comprising an array antenna comprised of a plurality of antenna elements as a receiving antenna, said method comprising:

a first step of obtaining a first correction value for each channel for correcting a phase shift between the channels of said plurality of antenna elements;

a second step of obtaining a second correction value for each said channel for correcting a deviation between an electrical center direction and a front direction obtained with phase correction using said first correction values; and a third step of obtaining a final correction value for each said channel from said first correction value and second correction value.

2. The method according to claim 1, wherein in said first step a first target is placed at a structural front of said radar apparatus, said radar apparatus is actuated channel by channel for said antenna elements, such a phase correction value as to match a direction of said first target with a direction of 0° is obtained for each said channel, and this phase correction value is used as said first correction value.

3. The method according to claim 2, wherein in said second step second and third targets having an equal cross section of reflection to that of the first target are placed at an equal distance from the radar apparatus and at an equal spacing to said first target, said radar apparatus is actuated to detect said first to third targets with effecting the phase correction with said first correction values, and said second correction value for each channel is obtained based on detection levels of the respective targets.

* * * * *